(12) United States Patent
Zivanovic

(10) Patent No.: US 11,893,055 B2
(45) Date of Patent: Feb. 6, 2024

(54) SYSTEM FOR AUTOMATIC MANAGEMENT AND DEPOSITING OF DOCUMENTS (IMAGES) HASH IN BLOCK-CHAIN TECHNOLOGY

(71) Applicant: Sava Zivanovic, Beograd (RS)

(72) Inventor: Sava Zivanovic, Beograd (RS)

( * ) Notice: Subject to any disclaimer, the term of this patent is extended or adjusted under 35 U.S.C. 154(b) by 352 days.

(21) Appl. No.: 17/414,719

(22) PCT Filed: Nov. 20, 2019

(86) PCT No.: PCT/RS2019/000028
§ 371 (c)(1),
(2) Date: Jun. 16, 2021

(87) PCT Pub. No.: WO2020/130864
PCT Pub. Date: Jun. 25, 2020

(65) Prior Publication Data
US 2022/0092104 A1 Mar. 24, 2022

(30) Foreign Application Priority Data
Dec. 21, 2018 (RS) .................. P-2018/1564

(51) Int. Cl.
*G06F 16/51* (2019.01)
*G06F 16/23* (2019.01)
*H04N 1/44* (2006.01)
*H04W 4/029* (2018.01)

(52) U.S. Cl.
CPC .......... *G06F 16/51* (2019.01); *G06F 16/2379* (2019.01); *H04N 1/444* (2013.01); *H04W 4/029* (2018.02)

(58) Field of Classification Search
CPC ...... G06F 16/51; G06F 16/2379; G06F 21/64; H04N 1/444; H04W 4/029; H04W 4/02; H04L 9/50; H04L 2463/101; H04L 63/123; H04L 9/3239
See application file for complete search history.

(56) References Cited

U.S. PATENT DOCUMENTS

| | | | |
|---|---|---|---|
| 2017/0046689 A1* | 2/2017 | Lohe ................... | G06Q 20/384 |
| 2017/0091756 A1* | 3/2017 | Stern .................... | G06Q 20/36 |
| 2017/0192994 A1 | 7/2017 | Hong et al. | |
| 2017/0232300 A1* | 8/2017 | Tran .................... | H04L 67/535 |
| | | | 434/247 |
| 2018/0181964 A1* | 6/2018 | Zagarese ......... | G06Q 20/40145 |
| 2018/0191503 A1* | 7/2018 | Alwar ..................... | H04L 9/14 |
| 2018/0294966 A1 | 10/2018 | Hyun et al. | |
| 2018/0344215 A1* | 12/2018 | Ohnemus ............... | A61B 5/1118 |
| 2019/0121811 A1* | 4/2019 | Cherukuri ............. | H04L 67/535 |
| 2023/0123322 A1* | 4/2023 | Cella .................... | G06Q 10/087 |
| | | | 700/29 |

FOREIGN PATENT DOCUMENTS

| | | |
|---|---|---|
| CA | 3019267 A1 | 11/2017 |
| WO | WO-2017/136879 A1 | 8/2017 |
| WO | WO-2018/127809 A2 | 7/2018 |
| WO | WO-2018/182861 A1 | 10/2018 |
| WO | WO-2018/184485 A1 | 10/2018 |

* cited by examiner

*Primary Examiner* — Angelica Ruiz
(74) *Attorney, Agent, or Firm* — MUNCY, GEISSLER, OLDS & LOWE, P.C.

(57) ABSTRACT

The system for automatic management and depositing of documents' (images') hash in the block-chain technology comprises of at least one device for documents' recording, and/or for the conversion of documents into digital photography (1), at least one device through which communication and encoding are performed (2), at least one device through which user authentication is performed (3), at least one device on which the block-chain base is located (4) and at least one device on which the hash base is located (5). The device (1) comprises at least a digital camera, a communication system, an image processing system and the GPS, and it may additionally include an adequate software application. The communication system is a virtual VPN specifically dedicated to the device (1), and communication among the devices within the system is carried out through the Internet and it is encoded. In the device (5), the hash base is divided per tables into blocks that can be fast searched by searching the tables linked to the blocks A−1, A and A+1 first, and the hash table determines the actual address of the document in the block-chain through the hash value.

6 Claims, 1 Drawing Sheet

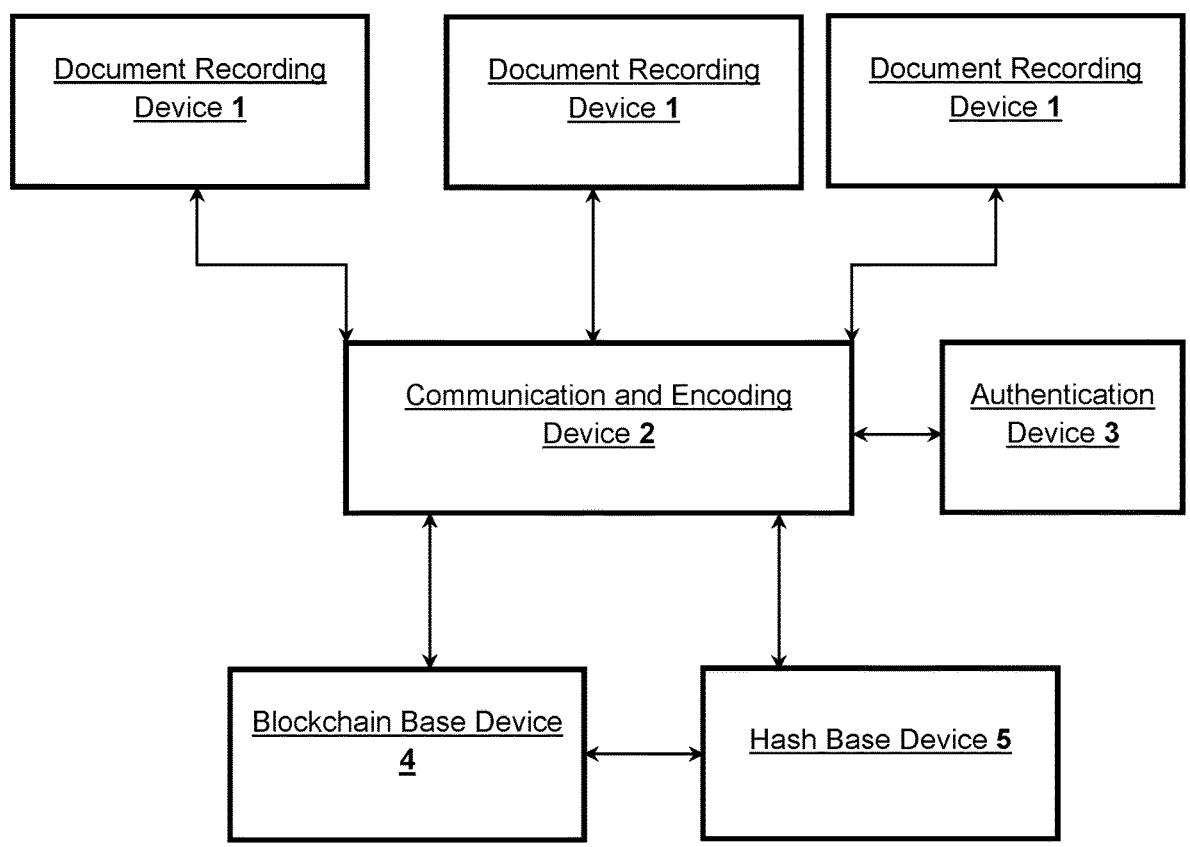

SYSTEM FOR AUTOMATIC MANAGEMENT AND DEPOSITING OF DOCUMENTS (IMAGES) HASH IN BLOCK-CHAIN TECHNOLOGY

TECHNICAL FIELD

The invention in question pertains to escrowing (storage and saving) of data, i.e. of the document/image hash in the block-chain technology and to the verification thereof, as well as to proving authorship of a photography and/or any other electronic document. According to the international Classification of Patents, the invention is to be classified in the following classes: G06F 19/00, G06F 21/00, G06F 17/30, G06F 21/56, G06Q 20/00, H04L 9/00.

The problem that this invention solves is how to ensure unchangeableness of the contents of the document escrowed, how to prove its authenticity and/or origin, i.e. to prove that it is the original and unchanged document, as well as to prove the authorship of the document and to collect a fee for the use of the document.

BACKGROUND ART

Today, the block-chain technology is a technology of current interest, and thus there are several thousands of patent documents relating to this field that are publicly available in different databases. Of course, it has not been possible to go through them all, but based on the search conducted, we have identified four documents, which are, in our opinion, closest to the invention in question. These are the following patent documents: WO2018184485 (A1), US2018294966 (A1), WO2018182861 (A1) and CA3019267 (A1). In the following part, we shall present summaries of these documents.

Patent document WO2018184485 (A1)—DIGITAL CERTIFICATE MANAGEMENT METHOD AND DEVICE, NON-VOLATILE READABLE STORAGE MEDIUM, AND SERVICE TERMINAL: This patent application pertains to the method and device for digital certificate management, non-volatile computer readable storage medium and service terminal. The method presented in the patent application includes: receipt of requests for broadcasting of the status of digital certificate, the request that is broadcast on the block-chain network by using another node in the network, where the first and the second nodes can be either two nodes on the block-chain network, validation of the request and, where the validation is successful, establishing of the block-chain information that is corresponding to the status of the digital certificate, where the block-chain information includes summary information about the digital certificate broadcast at the request for its broadcasting and information on the status the digital certificate broadcast and broadcasting of the block-chain information to other nodes, other than to the first node in the block chain network.

Patent document US2018294966 (A1)—BLOCK-CHAIN-BASED DIGITAL IDENTITY MANAGEMENT METHOD: This patent application pertains to the digital identity management method based on the block-chain technology. In the examples of application, the method includes the realization of the first process for storage of identity identification information of the subscription application in the first block-chain block as the response to the subscription application from the service requesting device, and then obtaining the value of the hash block for the first block as the result of execution of the first process, by carrying out of the second process for saving the hash block value for the first block and data on authentication of information for submission of subscription application in the second block-chain block, and then obtaining the hash block value for the second block as the result of execution of the second process and inserting the hash block value in the second block in the digital structure of identity data as the result of subscription application processing.

Patent document WO2018182861 (A1)—SYSTEMS AND METHODS FOR FAIR INFORMATION EXCHANGE USING PUBLISH-SUBSCRIBE WITH BLOCK-CHAIN: This patent application pertains to the method, device, system and products for facilitation of information exchange by using publication of subscription in the block-chain. The example for device includes an intermediary that includes a processor and distributes the module of the ledger. The module of the distributed ledger saves the message transmitted by the intermediary from the publisher to the subscriber. The above processor calculates at least, initiated by the receipt of message by the intermediary, the function of proving work (PoW). The processor from the example at least verifies the calculation or the PoW function, and following the verification of PoW function calculation, transmits the message to the subscriber. The above mentioned processor then processes the return information that the intermediary received in order to update the PoW function.

Patent document CA3019267 (A1)—A METHOD AND SYSTEM FOR CONTROLLING THE PERFORMANCE OF A CONTRACT USING A DISTRIBUTED HASH TABLE AND A PEER-TO-PEER DISTRIBUTED LEDGER: This patent application pertains to the computer-implemented method and system for controlling the performance of a smart contract. The method includes storing a contract on or in a computer-based repository. The contract is associated with a license between a first user and a second user. The method further includes receiving, over a communication network, a transaction that comprises a transfer of a token from an agent to the first user or to the second user. The transaction comprises metadata that includes an identifier that is indicative of the location where the contract is stored. The method further includes querying a peer-to-peer distributed ledger (i.e. block-chain) to determine whether the transaction comprises at least one unspent output. The method further includes, responsive to querying the peer-to-peer distributed ledger, determining whether to modify performance of the contract. The block-chain may be the Bitcoin block-chain.

A general observation would be that, to the best of our knowledge, there is no patent document that would identically resolve the technical problem as the invention from the patent application in question, as well as that no identically defined technical problem has been found in the patent documentation. By comparing the patent documents comprising the above quotations (the above mentioned patent applications) to the patent application in question, we have not established anything that would undermine the originality or the inventive level of the invention in question. The invention in question resolves a completely different technical problem than those in the inventions from the above quoted patent applications or in other documents comprising the state of the art for the invention in question. There are significant differences among the elements of the systems, as well as among the individual search and data verification methods. In the case of the invention in question, the rate of data search and input, the hash tables' search, as well as the ease of use, is all significantly higher.

Disclosure of the Invention

The system for automatic management and depositing of documents' (images') hash in the block-chain technology comprises of the following devices: at least one device for documents' recording, and/or for the conversion of documents into digital images 1, at least one device through which communication and encoding are performed 2, at least one device through which user authentication is performed 3, at least one device on which the block-chain base is located 4 and at least one device on which the hash base is located 5. In the technical sense, devices 2 and 3 and 4 and 5 as hardware can be placed within the same server. Communication between the devices in the system is carried out over the internet, in any manner available, and is encoded in order to prevent data manipulation, where the encoding algorithm can be any algorithm that complies with specific security standards.

BRIEF DESCRIPTION OF DRAWINGS

In the sole FIGURE, the block diagram of the system for automatic management and depositing of documents' (images') hash in block-chain technology is presented.

BEST MODE FOR CARRYING OUT OF THE INVENTION

The system for automatic management and depositing of documents' (images') hash in the block-chain technology as presented in the sole FIGURE comprises at least the following devices: at least one device for documents' recording, and/or for the conversion of documents into digital images 1, at least one device through which communication and encoding are performed 2, at least one device through which user authentication is performed 3, at least one device on which the block-chain base is located 4 and at least one device on which the hash base is located 5. In the technical sense, devices 2 and 3 and 4 and 5 as hardware can be placed within the same server.

The document recording device 1 comprises at least a digital camera (a camera or some other device used to create digital photography), a communication system, an image processing system and GPS. The communication system is a virtual VPN specifically dedicated to that device only, for the sake of improved security. The device 1 may incorporate a special software application installed on it, to enable system operation. The user may install a software application that is imitating the device 1 on a smart phone, table, laptop or some other device, and the user can either establish it on their own, or it can be automatically generated at the request of the user.

When the document in the documents recording device 1 is converted into a digital photography, then the device 1 is connected to the communication and encoding device 2 and sends through it an inquiry to the authentication device 3, which is then performing authentication and/or approving further use of the system for input, and to the device on which the block-chain base is located 4, in the block-chain block of which the hash of the digital photography will be stored. Device 4 through device 2 responds to the inquiry by means of a response which comprises the probable location of the block in which the hash of the digital photography will be written. When such reply arrives to the device 1, the digital photography is modified by entering a visible attribute in it which would uniquely mark that document in the block-chain base, such as, for example, the text Verified by Pi, and a barcode or (QR) of a barcode that comprises the value of the block in the block-chain, and, where necessary, some other additional information, such as, for example, the focal distance of the photography, the GPS location of the photography, identification data on the user—author of the photography and the device 1. The photography that is modified in the above manner can be saved in the device 1 in a number of different formats required for different purposes and conditions of use, during its saving, the hash of each photography format is created as well. It is then possible to send the photography that is modified in such a manner, with a code and the text "Verified by Pi" to any destination—for example, to the Instagram, Facebook or to some other social network.

The focal distance of the photography is stored in image metadata in device (1) and its purpose is to prevent that the photography is recorded again. The focal distance is determined by the device that is taking the photography and it is stored in metadata within the file in which the image is stored.

The device 1 includes OPS which determines the location (of the device, recording, user) for verification (authentication). It is also possible to store the GPS location in which the photography was taken.

The hash of the photography from the device 1 that is stored in the above specified manner is then sent through the device 2 to the device 4, i.e. to the block-chain base. In the block-chain base, at the request of the user, data on user (author of the photography and of the device) identification can be written as well. In the block-chain base (device 4), based on the photograph hash, the precise location in the base of the hash, i.e. in the device 5 is determined based on the photography hash, in which the photography hash will be written. The device 4, through the device 2, notifies the device 1 that the entry in the block-chain base has been made.

In the device 5, the hash base is divided into tables in blocks, and the photography hash is written in an adequate block in the hash base. In the device 5, i.e. in the hash base, fast search of individual blocks is performed by searching the tables related to the blocks A−1, A and A+1 first. The hash table determines the right address of the document in the block-chain, i.e. the block-chain base, through the hash value. If the entry in the block-chain is confirmed, that means that the image exists.

Communication between the devices in the system is performed through the Internet, and it is encoded to prevent manipulation of data. The encoding algorithm can be any algorithm that is accepted at least as the minimum standard by the NIST (National Institute of Standards and Technology, USA).

The user may use the system for displaying and checking authenticity of the deposited document (photography), as desired and freely, or alternatively with the option to collect a fee for each displaying of the deposited document.

INDUSTRIAL APPLICABILITY

The system for automatic management and depositing of documents' (images') hash in the block-chain technology as described above can be applied in all the developed systems that are safekeeping (storing) a substantial amount of photographies or documents. Such a system can, for example, be applied in the national libraries, archives, newspaper publishers and publishing houses, media companies, social networks and in particular in organizations for collective management of copyright and related rights (collecting societies), since it enables fast and easy identification of works (documents) and their authors, as well as any use of the works, and thus the adequate amount of fee for the use of the work can be precisely determined.

The invention claimed is:

1. A system for automatic management and depositing of documents' (images') hash in a block-chain technology, comprising:
   a document recording device for recording documents and conversion of the documents into a digital format,
   a communication and encoding device connected to the document recording device,
   an authentication device connected to the communication and encoding device for performing authentication and approving further use of the system for input, to at least one blockchain base device on which a blockchain base is located, and to at least one hash base device on which a hash base is located, and
   wherein the document recording device includes at least a digital camera (a camera or some other device for digital photography creation), a communication system, an image processing system, and additionally include an adequate software application, wherein the communication system is a virtual private network for the document recording device only, and the communication among the devices in the system is carried out through the internet and is encoded by any algorithm that is accepted at least as the minimum standard by the NIST (the National Institute of Standards and Technology, USA), and in the hash base device the hash base is divided by tables into blocks that can be searched fast by searching the tables linked to blocks A−1, A and A+1 first, while the hash table, through the hash value, determines the right address of the document in the block-chain,
   wherein the blockchain base device is configured to respond to the inquiry by means of a response, the response comprising a portable location of the block in which the hash of the digital format is written, and wherein upon receiving the response by the document recording device from the blockchain base device, the digital format of at least one document is modified by entering of a visible attribute in the digital format of the at least one document, the visible attribute marking the at least one document in the blockchain base.

2. The system of claim 1, wherein the communication and encoding devices, the authentication device, the blockchain base device, and the has base device are placed within a same server, and the software application that is imitating the document recording device is installed on a smart phone, tablet, laptop or some other device by the user, and the user either establishes the software application on their own, or the software application is automatically generated at the request of the user.

3. The system of claim 1, wherein if the document is converted into the digital format the document recording device, the document recording device connects to the communication and encoding device and enables the communication and encoding device to send an inquiry to the authentication device.

4. The system of claim 1, wherein if the response from the blockchain base device, specifying the block in the blockchain base in which the document will be written, reaches the document recording device, the focal distance of the digital format, the GPS location of the digital format, the identification data on the user—author of the digital format and of the document recording device, and the digital format thus modified is stored in the document recording device in a number of different formats required for different purposes and conditions of use of the digital format in the course of which the hash of each digital format is created, and each of the digital format is sent to any social network or to another user.

5. The system of claim 1, wherein in the block-chain base device precise placement of the digital format, based on the hash of the digital format, is determined in the hash base device, wherein the base of the hash is divided by tables into blocks, and in which the actual address of the document in the block-chain base is determined on the basis of the hash value, while the confirmation of the entry in the block-chain base denotes the existence of the document.

6. The system of claim 4, wherein the focal distance of the digital format is determined by the document recording device the document recording device stores the focal distance of the digital format in metadata within the file in which the image is stored, and in the same manner the GPS location where the digital format was taken is stored, where such location is determined by the GPS located in the document recording device.

\* \* \* \* \*